(12) United States Patent
Conley et al.

(10) Patent No.: US 11,992,767 B2
(45) Date of Patent: May 28, 2024

(54) ONLINE FEEDBACK PLATFORM

(71) Applicants: The Trustees of Princeton University, Princeton, NJ (US); The City University of New York, New York, NY (US)

(72) Inventors: Dalton Conley, New York, NY (US); Ofer Tchernichovski, Wappingers Falls, NY (US)

(73) Assignees: THE TRUSTEES OF PRINCETON UNIVERSITY, Princeton, NJ (US); THE CITY UNIVERSITY OF NEW YORK, New York, NY (US)

( * ) Notice: Subject to any disclaimer, the term of this patent is extended or adjusted under 35 U.S.C. 154(b) by 107 days.

(21) Appl. No.: 17/695,154

(22) Filed: Mar. 15, 2022

(65) Prior Publication Data

US 2022/0305387 A1 Sep. 29, 2022

Related U.S. Application Data

(60) Provisional application No. 63/165,461, filed on Mar. 24, 2021.

(51) Int. Cl.
*A63F 13/63* (2014.01)
*A63F 13/71* (2014.01)

(52) U.S. Cl.
CPC .............. *A63F 13/63* (2014.09); *A63F 13/71* (2014.09); *A63F 2300/535* (2013.01); *A63F 2300/6018* (2013.01)

(58) Field of Classification Search
CPC . G06Q 30/02; G06Q 30/0282; G06F 3/04847
See application file for complete search history.

(56) References Cited

PUBLICATIONS

Becker, et al., "Network Dynamics of Social Influence in the Wisdom of Crowds", Proceedings of the National Academy of Sciences of the USA, vol. 114, 26, Jun. 12, 2017, E5070-E5076.*
Palan, et al., "Prolific.ac—A Subject Pool for Online Experiments", Journal of Behavioral and Experimental Finance, vol. 17, Dec. 21, 2017, 22-27.
Prelec, et al., "A Solution to the Single-Question Crowd Wisdom Problem", Nature, vol. 541, Jan. 26, 2017, 532-535.

(Continued)

*Primary Examiner* — Lawrence S Galka
(74) *Attorney, Agent, or Firm* — MEAGHER EMANUEL LAKS GOLDBERG & LIAO, LLP

(57) ABSTRACT

Disclosed is a method for experimentally optimizing information quality and engagement in crowd sourced evaluation systems. It allows estimating efficiencies of different strategies to provide the greatest opportunity for social learning. It can be used for continuous tuning of social feedback. Also disclosed is a system that allows experimentation with crowd sourced evaluations of virtual services. The experimental system supports large scale online recruitment of participants into web-browser 3D virtual world. The virtual world can be designed to approximate several types of real-world, distributed information systems. Social influences can be experimentally introduced into the feedback system in order to empirically optimize its utility.

11 Claims, 5 Drawing Sheets

(56) References Cited

PUBLICATIONS

Reips, et al., "WEXTOR: A Web-Based Tool for Generating and Visualizing Experimental Designs and Procedures", Behavior Research Methods, Instruments, & Computers, vol. 34, No. 2, 2002, 234-240.
Ross, et al., "Who are the Crowdworkers? Shifting Demographics in Amazon Mechanical Turk", CHI 2010, Apr. 10-15, 2010, 2863-2872.
Schneider, et al., "Modular Politics: Toward a Governance Layer for Online Communities", Available at: http://arxiv.org/abs/2005.13701, Oct. 17, 2020, 26 pages.
Schneider, N., "Admins, Mods, and Benevolent Dictators for Life: The Implicit Feudalism of Online Communities", New Media & Society, vol. 24, No. 9, Jan. 7, 2021, 1965-1985.
Suri, et al., "Cooperation and Contagion in Web-Based, Networked Public Goods Experiments", PLoS One, vol. 6, No. 3 (e16836), Mar. 11, 2011, 18 pages.
Tan, et al., "Introducing Govbase—An open database of projects and tools in online governance", The Metagovernance Project, Nov. 8, 2020, 19 pages.
Tchernichovski, et al., "Crowd Wisdom Enhanced by Costly Signaling in a Virtual Rating System", Proceedings of the National Academy of Sciences of the USA, vol. 116, No. 15, Mar. 26, 2019, 7256-7265.
Tchernichovski, et al., "Tradeoff Between Distributed Social Learning and Herding Effect in Online Rating Systems: Evidence From a Real-World Intervention", SAGE Open, Feb. 1, 2017, 7 pages.
Trice, et al., "Building Dark Patterns into Platforms: How GamerGate Perturbed Twitter's User Experience", vol. 6, No. 3, 2018, 11 pages.
Willer, et al., "Reciprocity on the Hardwood: Passing Patterns Among Professional Basketball Players", PLoS One, vol. 7, No. 12 (e49807), Dec. 7, 2012, 7 pages.
Zhang, et al., "An Explorative Study on the Virtual World: Investigating the Avatar Gender and Avatar Age Differences in their Social Interactions for Help-Seeking", Information Systems Frontiers, vol. 22, Feb. 18, 2019, 911-925.
Zhang, et al., "PolicyKit: Building Governance in Online Communities", UIST '20, Oct. 20-23, 2020, 14 pages.
Zhong, et al., "Institutional Similarity Drives Cultural Similarity Among Online Communities", Scientific Reports, vol. 12, Nov. 8, 2022, 9 pages.
Ahn, et al., "Reputation and Cooperation in Voluntary Exchanges: Comparing Local and Central Institutions", The Journal of Politics, vol. 71, No. 2, Apr. 2009, 398-413.
Akcay, et al., "Biological Institutions: The Political Science of Animal Cooperation", SSRN Electronic Journal, Jul. 2013, 46 pages.
Almaatouq, et al., "Empirica: A Virtual Lab for High-Throughput Macro-Level Experiments", arXiv, Available at: http://arxiv.Org/abs/2006.11398, Dec. 30, 2020, 36 pages.
Awad, et al., "The Moral Machine Experiment", Nature, vol. 563, No. 7729, Oct. 24, 2018, 59-64.
Axelrod, et al., "The Evolution of Cooperation", Science, vol. 211 No. 4489, Mar. 27, 1981, 1390-1396.
Balietti, et al., "nodeGame: Real-Time, Synchronous, Online Experiments in the Browser", Behavior Research Methods, vol. 49, Nov. 18, 2016, 1696-1715.
Balietti, et al., "Peer Review and Competition in the Art Exhibition Game", Proceedings of the National Academy of Sciences of the USA, vol. 113, No. 30, Jul. 26, 2016, 8414-8419.
Bititci, et al., "Dynamics of Performance Measurement Systems", International Journal of Operations & Production Management, vol. 20, No. 6, 2000, 692-704.
Bodin, O., "Collaborative Environmental Governance: Achieving Collective Action in Social-Ecological Systems", Science, vol. 357, No. 6352, Aug. 18, 2017, 9 pages.
Bojanowski, et al., "Enriching Word Vectors with Subword Information", Transactions of the Association for Computational Linguistics, vol. 5, Jun. 2017, 135-146.
Centola, D., "The Spread of Behavior in an Online Social Network Experiment", Science, vol. 329, No. 5996, Sep. 3, 2010, 1194-1197.
Chen, et al., "oTree—An Open-Source Platform for Laboratory, Online, and Field Experiments", Journal of Behavioral and Experimental Finance, vol. 9, Jan. 19, 2016, 88-97.
De Leeuw, Joshua R., "jsPsych: A JavaScript Library for Creating Behavioral Experiments in a Web Browser", Behavior Research Methods, vol. 47, No. 1, Mar. 28, 2014, 12 pages.
Finger, et al., "LabVanced: A Unified JavaScript Framework for Online Studies", International Conference on Computational Social Science, Jul. 10-13, 2016, 3 pages.
Frey, et al., "Emergence of Integrated Institutions in a Large Population of Self-Governing Communities", PloS one, vol. 14, No. 1, e0216335, Jul. 11, 2019, 18 pages.
Galton, F., "Vox Populi", Nature, vol. 75, No. 1949, Mar. 7, 1907, 450-451.
Gauci, et al., "Horizon: Facebook's Open Source Applied Reinforcement Learning Platform", arXiv, Sep. 4, 2019, 10 pages.
Giamattei, et al., "LIONESS Lab: A Free Web-Based Platform for Conducting Interactive Experiments Online", Journal of the Economic Science Association, vol. 6, No. 1, Jun. 27, 2020, 95-111.
Gureckis, et al., "psiTurk: An Open-Source Framework for Conducting Replicable Behavioral Experiments Online", Behavior Research Methods, vol. 48, No. 3, Oct. 1, 2015 829-842.
Gurerk, et al., "The Competitive Advantage of Sanctioning Institutions", Science, vol. 312, No. 5770, Apr. 7, 2006, 108-111.
Hardin, G., "The Tragedy of the Commons", Science, vol. 162, Dec. 13, 1968, 1243-1248.
Harrison, et al., "Gibbs Sampling with People", arXiv, 2020, 35 pages.
Hartshorne, et al., "A Thousand Studies for the Price of One: Accelerating Psychological Science with Pushkin", Behavior Research Methods, vol. 51, Feb. 11, 2019, 1782-1803.
Heckman, J. J., "Sample Selection Bias as a Specification Error", Econometrica, vol. 47, No. 1, Jan. 1979, 153-161.
Hertwig, R., "Tapping into the Wisdom of the Crowd—with Confidence", Science, vol. 336, No. 6079, Apr. 20, 2012, 303-304.
Horton, et al., "The Online Laboratory: Conducting Experiments in a Real Labor Market", Experimental Economics, vol. 14, No. 3, Jan. 6, 2011, 399-425.
Janssen, et al., "Lab Experiments for the Study of Social-Ecological Systems", Science, vol. 328, No. 5978, Apr. 30, 2010, 613-617.
Jayles, et al., "How Social Information Can Improve Estimation Accuracy in Human Groups", Proceedings of the National Academy of Sciences of the USA, vol. 114, No. 47, Nov. 21, 2017, 12620-12625.
Jhaver, et al., "Human-Machine Collaboration for Content Regulation: The Case of Reddit Automoderator", ACM Transactions on Computer-Human Interaction, vol. 26, No. 5, Article No. 31, Jul. 2019, 35 pages.
Kearns, et al., "An Experimental Study of the Coloring Problem on Human Subject Networks", Science, vol. 313, No. 6788, Aug. 11, 2006, 824-827.
Kevic, et al., "Characterizing Experimentation in Continuous Deployment: A Case Study on Bing", 2017 IEEE/ACM 39th International Conference on Software Engineering: Software Engineering in Practice Track (ICSE-SEIP), Institute of Electrical and Electronics Engineers Inc., 2017, 123-132.
Kramer, et al., "Experimental Evidence of Massive-Scale Emotional Contagion Through Social Networks", Proceedings of the National Academy of Sciences of the USA, vol. 111, No. 24, Jun. 17, 2014, 8788-8790.
Lazer, et al., "Computational Social Science: Obstacles and Opportunities", Science, vol. 369, No. 6507, Aug. 28, 2020, 1060-1062.
Li, et al., "Non-Consensus Opinion Models on Complex Networks", arXiv, Oct. 3, 2012, 38 pages.
Lorenz, et al., "How Social Influence Can Undermine the Wisdom of Crowd Effect", Proceedings of the National Academy of Sciences of the USA, vol. 108, No. 22, May 31, 2011, 9020-9025.
Luca, M., "Reviews, Reputation, and Revenue: The Case of Yelp. Com", SSRN Electronic Journal, 2011, 41 pages.
Mannes, et al., "The Wisdom of Select Crowds", Journal of Personality and Social Psychology, vol. 107, No. 2, 2014, 276-299.

(56) References Cited

PUBLICATIONS

Mao, et al., "Resilient Cooperators Stabilize Long-Run Cooperation in the Finitely Repeated Prisoner's Dilemma", Nature Communications, vol. 8, No. 13800, Jan. 13, 2017, 10 pages.

Marwell, et al., "Experiments on the Provision of Public Goods. I. Resources, Interest, Group Size, and the Free-Rider Problem", American Journal of Sociology, vol. 84, No. 6, May 1979, 1335-1360.

Mason, et al., "Conducting Behavioral Research on Amazon's Mechanical Turk", Behavior Research Methods, vol. 44, Jun. 30, 2011, 23 pages.

Mason, et al., "Propagation of Innovations in Networked Groups", The Journal of Experimental Psychology: General, vol. 137, No. 3, 2008, 422-433.

Matias, et al., "CivilServant: Community-Led Experiments in Platform Governance", CHI '18: Proceedings of the 2018 CHI Conference on Human Factors in Computing Systems, 2018, 13 pages.

Matias, J. N., "Preventing Harassment and Increasing Group Participation Through Social Norms in 2,190 Online Science Discussions", Proceedings of the National Academy of Sciences of the USA, vol. 116, No. 20, Apr. 29, 2019, 9785-9789.

Mattos, et al., "Your System Gets Better Every Day You Use It: Towards Automated Continuous Experimentation", 2017 43rd Euromicro Conference on Software Engineering and Advanced Applications, 2017, 256-265.

Melamed, et al., "Cooperation, Clustering, and Assortative Mixing in Dynamic Networks", Proceedings of the National Academy of Sciences of the USA, vol. 115, No. 5, Jan. 30, 2018, 951-956.

Melamed, et al., "The Robustness of Reciprocity: Experimental Evidence That Each Form of Reciprocity Is Robust to the Presence of Other Forms of Reciprocity", Science Advances, vol. 6, Jun. 3, 2020, 7 pages.

Moe, et al. "Online Product Opinions: Incidence, Evaluation, and Evolution", Marketing Science, vol. 31, No. 3, Aug. 25, 2011, 372-386.

Mullensiefen, et al., "The Musicality of Non-Musicians: An Index for Assessing Musical Sophistication in the General Population", PLoS One, vol. 9, No. 2, Feb. 26, 2014, 23 pages.

Okada, A., "The Second-Order Dilemma of Public Goods and Capital Accumulation", Public Choice, vol. 135, Nov. 15, 2007, 165-182.

\* cited by examiner

ONLINE FEEDBACK PLATFORM

CROSS-REFERENCE TO RELATED APPLICATIONS

This application claims priority to U.S. Provisional Patent Application 63/165,461, filed Mar. 24, 2021, the entirety of which is incorporated by reference herein.

BACKGROUND

The statistical gold standard for designing crowd-sourced information systems has been to obtain independent and unbiased evaluations. But in crowd sourced systems that rely on voluntary cooperation, outcomes may depend on dynamic interactions between cooperation and crowd wisdom. Minimizing social influences then bears the cost of compromising crowd wisdom. More importantly, minimizing social influences may interfere with efforts to perpetuate cooperation.

A technique for improving the utility of social influences in crowd sourced evaluation systems is therefore useful and desirable.

BRIEF SUMMARY

The present disclosure provides a generalized system for such improvement by presentation of trends of ratings/evaluations in lieu of the traditional approach of reporting cumulative scores. The disclosed system sacrifices the independence of evaluations (i.e., users see recent evaluations of other users rather than just a summative total of all evaluations) in order to promote a virtuous feedback loop between crowd wisdom and cooperation to better enable social learning between the parties on any two-sided communication platform that relies on feedback, such as between services or goods providers, on the one hand, and users or consumers, on the other hand.

The temporal resolution (binning) of trends presented is a critical parameter: shorter time scales may detect a change sooner, which in multi-agent systems may facilitate identification of causation. However, presenting trends in longer time scales is less noisy, and can detect slow trends. The present disclosure includes, inter alia, a simulation in a virtual world that can be used to calibrate this (and other) parameters of the feedback system.

A first aspect of the present disclosure is drawn to a method for improving feedback. The method comprises first providing a virtual world simulation, such as a virtual world simulation game, capable of gathering input from a user, the simulation game based on one or more parameters, the parameters relating to a rating device, a distributed feedback monitoring method, implementation of a machine learning algorithm for optimization of rating system features, or a combination thereof. A plurality of users are allowed to participate in the virtual world simulation game, optionally over a prolonged period, to reveal how the information system is evolving over time. During the game, multiple parameters may be set or adjusted dynamically. A set of feedback may be captured from the plurality of users during the virtual world simulation game, where a dashboard showing at least one previous rating, an average rating, a rating trend, information from related feedback, or a combination thereof is displayed to at least one of the plurality of users before the user's feedback is captured. Repeat the playing, setting/adjusting parameters, and capturing feedback process at least once. The method also includes displaying the captured sets of feedback, one or more values derived from the captured sets of feedback, one or more values derived from a ground truth and the captured sets of feedback, or a combination thereof. The method may then include receiving a selection of one of the captured sets of feedback and implementing a feedback system outside the virtual world simulation game based on the parameters used when the selected set of feedback was captured.

In some embodiments, each plurality of users is subdivided into a plurality of subgroups (including a first subgroup and a second subgroup), and each subgroup represents a different group within the game. In some embodiments, the first subgroup may represent consumers and a second subgroup may represent service providers. In some embodiments, one or more of the users serves on a committee, a board, or both, within the game.

In some embodiments, the method may also include occasionally receiving feedback from each user relating to that user's preferences in governance space.

In some embodiments, the information from related feedback may be based on a determined similarity between text in the information and text received from the user. For example, if the user begins to enter text referencing a specific element, such as "Adam is too expensive" (where Adam is a ferry driver), the method may involve then identifying previous feedback related to the cost of Adam's services, which inherently requires determining a similarity score comparing the text in the previous feedback and the text received from the user. Here, it could find a previous feedback where a user had indicated "Adam costs too much", which would have a high degree of similarity to "Adam is too expensive". The dashboard could then display the previous feedback. In some embodiments, the adjustment to a parameter is a step change or a trajectory parameter transition over time.

In some embodiments, the virtual world simulation game may be configured to allow early detection of a change in cooperation and crowd-wisdom. In some embodiments, the early detection of the change anticipates an imminent collapse of the system. In some embodiments, the method may include preventing a collapse of the system based on the earlier detection of the change.

A second aspect of the present disclosure is drawn to servers, clients, etc., configured to utilize the methods disclosed herein. In some embodiments, a server is provided, comprising a processor and non-transitory computer readable medium containing instructions that, when executed, cause the processor to: (i) allow users on a plurality of clients to access a virtual world simulation game capable of gathering input from a user, the game based on one or more parameters, the parameters relating to a rating device, a distributed feedback monitoring method, implementation of a machine learning algorithm for optimization of rating system features, or a combination thereof; (ii) allow an administrator to set or adjust at least one of the one or more parameters; (iii) send data to display to one of the plurality of users prior to the user sending feedback, the data comprising at least one previous rating, an average rating, a rating trend, information from related feedback, or a combination thereof (iv) receive feedback from the plurality of users during the virtual world simulation game and from at least one additional virtual world simulation game where at least one of the one or more parameters has been changed; and (v) display the feedback, one or more values derived from the feedback, one or more values derived from a ground truth and the feedback, or a combination thereof.

In some embodiments, a client is provided, comprising a processor (sometimes referred to as a "client processor" to distinguish from the server processor), and non-transitory computer readable medium containing instructions that, when executed, cause the client processor to: (i) enter feedback while playing a virtual world simulation game, where multiple parameters are set or adjusted dynamically during the virtual world simulation game; (ii) receive data from a server related to the feedback before or during a time when a user is entering the feedback; (iii) display the received data; and (iv) send the feedback to the server.

In some embodiments, a system is provided that includes a disclosed server and a plurality of the disclosed clients.

DETAILED DESCRIPTION

Figure 1A:
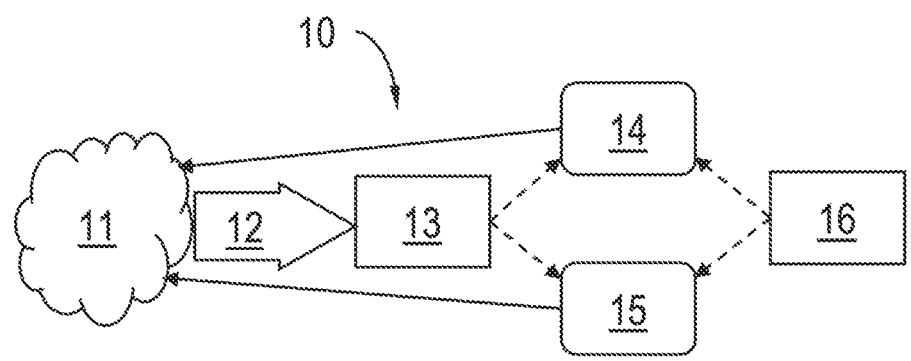
FIGS. 1A and 1B are schematics of examples of online governance systems

Disclosed is a dynamic dashboard technique for optimization of social learning in a safe virtual world simulation game environment that, once the improved parameters are determined, can then be translated to governance structures external to the virtual world simulation game. Rather than mean rating scores, the disclosed system presents and optimizes trends. The parameters of trend presentation are optimized empirically. That is, the binning of feedback (i.e., how sensitive or smoothed the trends are across time bins) is tuned to enhance social learning in particular each particular manifestation.

Exposing service clients to trends in rating scores—just prior to rating—is associated with a persistent improvement in satisfaction with services over time. It is also associated with the community sustaining a high feedback rate over time, since users know that trends—much more than total averages—are sensitive to their scores. In addition, introducing social influences may promote self-organization of social information. For example, in a petition system, presenting users with similar petitions while filling out the petition form, may prompt users to amend and endorse existing petitions instead of creating redundant new petitions.

The challenge in these systems and methods is how to channel activism away from the wild (and mostly futile) social dynamics of echo chambers and internet-storms into petition systems where participant influence is balanced, petitions can evolve, and where one can quantify the extent to which feedback and deliberation can become more constructive in a controlled environment.

In this vein, the disclosed system can allow for the evaluation of social learning dynamically: how presenting trends in rating scores improve social learning, prompting both clients and providers to adjust their strategies more efficiently. Note that even in a company that runs a simple operation, social learning may show complex temporal dynamics: the detection of a trend gives both clients and service providers an opportunity for social learning: service providers can "experimentally" adjust their behavior/product in real time in response to changes in trends, while consumers can make choices with more up-to-date information. Each side can learn more effectively from the other.

The disclosed system and method utilize a process by which consumers and/or producers of goods and/or services can organize ratings temporally. This can be done through, e.g., a web browser extension on the user side or by the producer side as a feature of their display of ratings. This innovation allows the user to adjudicate between choices with more timely and relevant information (i.e., the difference between two "four-star" rated restaurants may be that one is improving in quality and the other is declining). Moreover, it allows the producer or service provider to learn from the trend information, by observing the impact of dynamic changes in the nature of the service or product on ratings in real time.

Many online communities enjoy little voice regarding the governance of their fora, which are typically controlled by appointed administrators, along with rules and bylaws set by the platform owner—usually a corporation aiming at increasing traffic, or a "benevolent dictator". However, there is now a trend toward replacing such centralized approaches with more democratic governance methods. Toolkits such as Modular Politics, PolicyKit, and others now provide online communities with self-governance tools that can be tailored to fit the needs and values of specific communities. These include online voting, juries, petition, elected boards, and even more complex institutional logics (see, e.g., communityrule.info/templates/).

The relative ease through which online governance tools can be implemented and experimented with, across a variety of platforms, has important implications. The present disclosure relates to the evolution of institutional logic in online communities and how such an evolution can be guided by experimentation.

From an ecological perspective, online communities are ideal settings for the rapid evolution of governance: they are often young and growing, information spreads rapidly, and there is sometimes strong competition among platforms. Moreover, governance tools may rapidly drift from the roles intended by their authors, as unintended consequences of a small change cascade through a population. Such a dynamic was seen, for example, in the "Reddit Blackout," in which community leaders creatively leveraged a simple mechanism for making channels private to affect a protest in which they disabled large portions of the site (one of the top ten on the Internet), an action which led shortly thereafter to the resignation of the platform's CEO. Such shifts in governance may affect the survival (fitness) of communities, and lead to novel forms of governance via "natural" selection. But, of course, "mutations" in governance are rarely random as in the case of biological systems. Rather, they are directed, adaptive modifications of institutional logic aimed at coping with emerging needs and challenges. Indeed, in this way, they more resemble Lamarckian cultural evolution, proposing that an organism (here an organization) can control its evolution based on its experience. Lamarckian and Darwinian evolution often complement each other and there is a large body of work about cultural evolution in humans and other animals.

Several experimental approaches could potentially guide and facilitate the evolution of online governance. To give an explicit example, consider two fictive cases that may not capture the diverse needs of online communities, but include governance features that should be relevant to many communities.

The first case is of a non-governmental organization (NGO) that provides online services to a community. Referring to FIG. 1A, the governance structure 10 can be seen to include a board 16 that manages services 14, 15 and sets policies and resources for each service. Governance tools include a feedback system 12 for gathering feedback from the community 11, and a specialized committee 13 to facilitate satisfaction with services 14, 15. In FIG. 1A, solid arrowed lines indicate primary processes, while dotted arrowed lines indicate secondary (slower) processes. Note that here community feedback could be as simple as client rating scores for events of service provision.

Figure 1B:
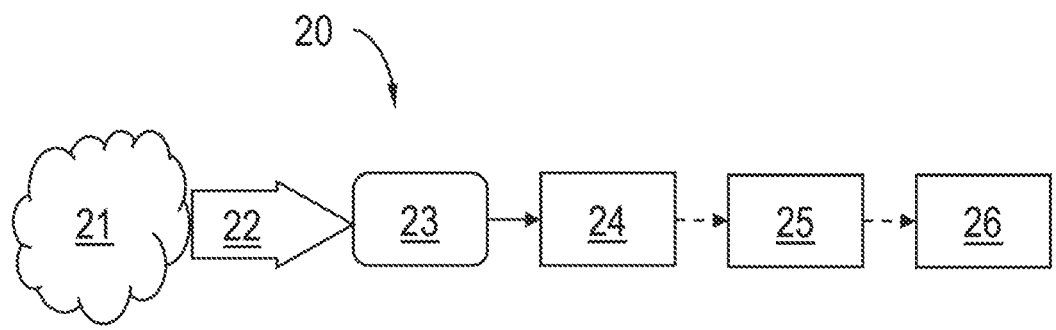

The second case represents a more open-ended challenge: a community that set a petition system to continuously guide governance. Referring to FIG. 1B, in the governance structure 20, to promote equality of influence, the community 21 sets an annual petitions quota 22 on each member. They set two committees 24, 25 and a board 26 to process the stream of petitions: petitions are first sorted into clusters by one committee 24. A second committee 25 then evaluates costs and feasibilities for each cluster. Finally, the board 26 sets policies, which are guided by the petition system 23. Note that here community feedback is in the form of verbalizing views, grievances and needs, speaking and being heard, i.e., democratic discussion.

In both cases, the governance structure is relatively simple and yet, outcomes may depend on complex interactions between several variables. For example, in the petition system, the community needs to set a petitions quota, frequencies for committee meetings, thresholds for propagating & filtering petitions in each stage, etc.

Disclosed is a method for improving feedback to allow such communities within the virtual world simulation game to improve their governance, which, when the governance parameters are translated to communities outside the virtual world simulation game, allows those external communities to also improve their governance.

Figure 2:
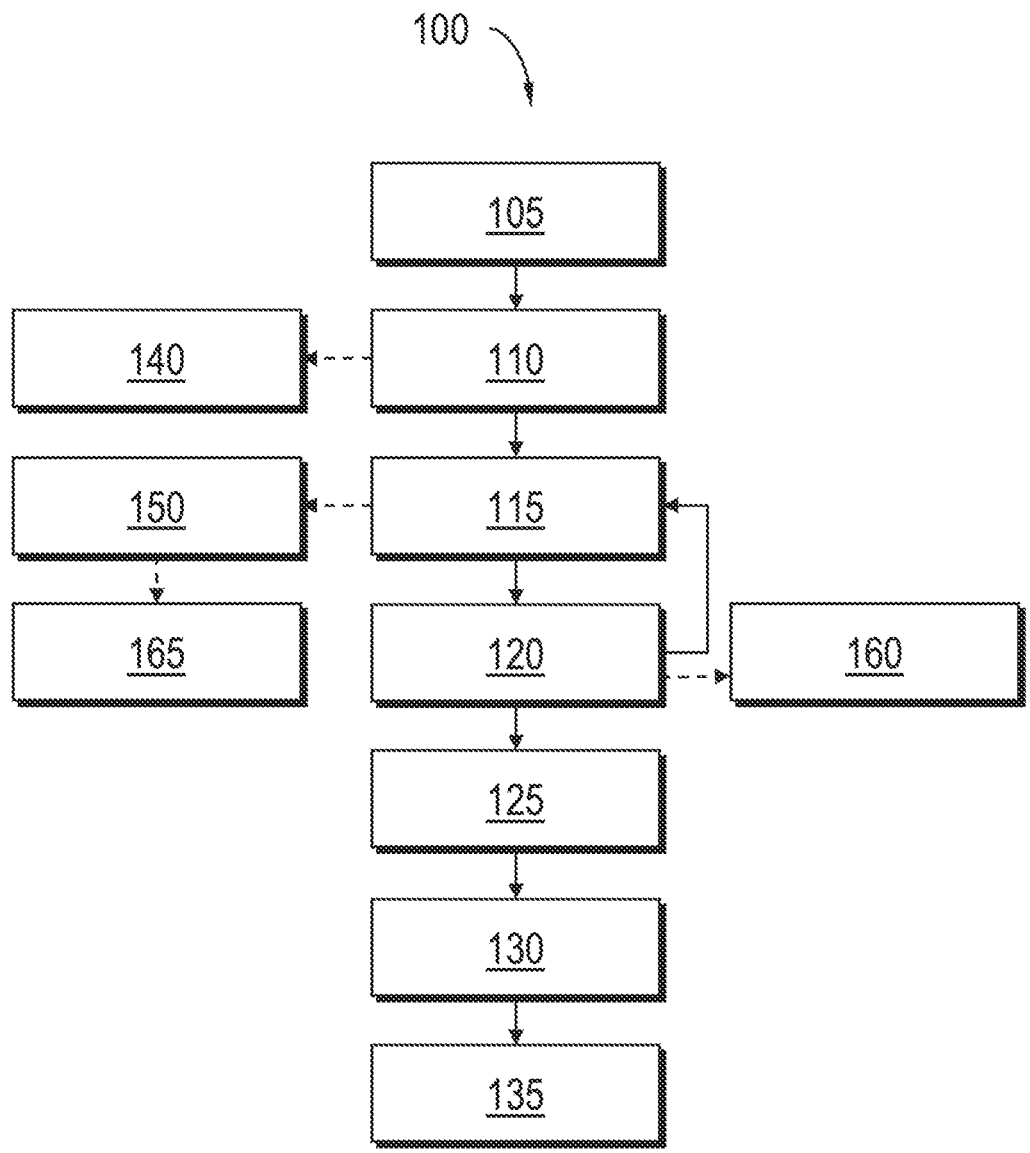
FIG. 2 is a flowchart of an embodiment of a method for improving feedback.

Referring to FIG. 2, in some embodiments, the method 100 may comprise providing 105 a virtual world simulation game capable of gathering input from a user and allowing 110 a plurality of users to participate in the virtual world simulation game.

An example of the virtual world simulation game is a Ferry Simulation Game (FSG), available at github.com/oferon/FerryGame. FSG is coded in the gaming platform Unity, where building arbitrarily complex 3D rating devices (game objects) with physics can be easily implemented. The game can be compiled as-is into either a desktop application for lab experiments, or into a WebGL for online experiments via a browser, or into a phone app, for long-term experiments.

The simulation game may be based on one or more parameters relating to: (i) a rating device; (ii) a distributed feedback monitoring method; (iii) implementation of a machine learning algorithm for optimization of rating system features; (iv) or a combination thereof.

The method may also include adjusting and/or setting parameters 115, dynamically, during the game. In some embodiments, the adjustment to a parameter is a step change or a trajectory parameter transition over time.

The method may involve capturing 120 a set of feedback from the plurality of users during the virtual world simulation game, where a dashboard showing at least one previous rating, an average rating, a rating trend, information from related feedback, or a combination thereof is displayed to at least one of the plurality of users before the user's feedback is captured.

In some embodiments, the information from related feedback is based on a determined similarity between text in the information and text received from the user. For example, in some embodiments, as the user is entering text into a text field, one or more processor is comparing the entered text to text from other feedback and making a determination 150 as to the similarity between the entered text and the other feedback. In some embodiments, the method may involve accessing a database that contains the provided feedback. That is, in some embodiments, after capturing 120 a set of feedback, the feedback is stored 160 in a database. Later, such as when determining 150 similarities, the database may be accessed again to search and/or retrieve 165 information from the database. Once the similarity determination 150 is made, the appropriate information may then be displayed to the user.

The process of adjusting and/or setting parameters 115 and capturing 120 a set of feedback is repeated at least once.

In some embodiments, players are allowed to play for only a relatively short period of time (e.g., 1 hour or less, or no more than, e.g., 4 rounds of play). In some embodiments, players are allowed to play for extended period of time (e.g., 24 hours or more, or no less than, e.g., 5 rounds of play), to reveal how the information system is evolving over time.

In some embodiments, all users are subdivided into a plurality of subgroups, and each subgroup represents a different group within the game. In some embodiments, a first subgroup represents consumers, and a second subgroup represents service providers. In some embodiments, one or more of the plurality of users serves on a committee, a board, or both, within the game.

After the process has been repeated and feedback has been captured, the captured feedback or information related to the captured feedback is then displayed to a user, e.g., a board member or a service provider. In some embodiments, the method may involve displaying 125 some or all of the captured feedback, one or more values derived from the captured sets of feedback, one or more values derived from a ground truth and the captured sets of feedback, or a combination thereof.

The process may then include receiving 130 a selection of one of the captured sets of feedback (including selection of one or more of the displayed captured feedback, values derived from the captured sets of feedback, values derived from a ground truth and the captured sets of feedback, or a combination thereof).

The process may then include implementing 135 the feedback system outside the virtual world simulation game based on the parameters used when the selected set of feedback was captured.

In some embodiments, the method may include occasionally receiving 140 feedback from each user relating to that user's preferences in governance space. This feedback may be unsolicited, may be solicited (e.g., requested by another member of the community, or periodically requested automatically).

In some embodiments, the virtual world simulation game may be configured to allow an early detection of a change in quality, by incorporating more accurate ratings (e.g., via a time cost to extreme ratings), and displaying trending as opposed to pooling results.

In some embodiments, the early detection of the change may anticipate an imminent collapse of the system. For example, presenting trends rather than a cumulative average of rating scores allows service or goods providers to recover quickly in the event of a downturn in ratings by detecting how changes in service or goods provision affects ratings in real time, thereby anticipating an imminent collapse. In some embodiments, this early detection allows the service or goods provider to make adjustments.

The presentation of trends improves the speed at which the impact of decisions can be detected, and allows users to see if service or goods providers are actively improving their services or goods. For example, the presentation of trends allows for a provider to detect a decrease in quality, and then recover by improving quality since more recent services or goods will be more heavily represented in a trend and thus earlier low-ratings will not serve as an insuperable drag on ratings in a competitive marketplace, avoiding a death spiral due to early negative ratings. Conversely, displaying trends prevents providers from relying on early high ratings to bolster their average as quality of services or goods may drift downward.

In some embodiments, after anticipating an imminent collapse, the method may comprise preventing a collapse of the system based on the early detection of the change, e.g., by adjusting parameters, adjusting participants and/or subgroups, or a combination thereof.

Rating Device

The rating device may be any appropriate rating device. As is known in the art, many systems utilize rating devices that implement Likert scales, such as 1-5 "star" ratings, where the rating device may be, e.g., a trivial click and submit radio group. Pooled star ratings can then be made visible to both creators and consumers of content, or in e-commerce, to service providers and potential clients.

Figure 3A:
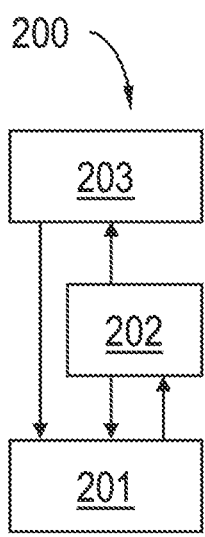
FIGS. 3A-3C are schematic illustrations of examples of rating systems used in governance.

Referring briefly to FIG. 3A, use of a simple feedback loop for guiding behaviors can be seen. In this approach 200, the clients 201 provide feedback to a simple rating device 202 (or the clients use the rating device to submit their feedback to the system running the rating device), such a star rating system. The feedback ratings (either individual ratings or pooled ratings) are then displayed to the clients 201 and the service provider 203 (e.g., the virtual world simulation game provider), who can modify their service, thereby providing feedback to clients 201.

There are many concerns about the quality (and honesty) of such rating scores. A recent experiment found that even without any conflicts of interest or incentives to cheat, pooled rating scores could explain only about 14% of the variance in the speed of ferries. However, pooled rating accuracy was about twice as high when ratings were submitted via a device that imposed time costs of a few seconds on reporting extreme scores. Thus, a parameter relating to the rating device may include parameters relating to a time cost for providing or adjusting the ratings.

Such an improvement in feedback information quality could be useful in, e.g., the case of the NGO providing online services (see FIG. 1A). With better rating accuracy the evaluation committee should be able to detect a change in satisfaction with its service outcome much faster. This may have two practical advantages. First, services can respond to the change faster. Second, the sooner a change can be detected the easier it is to identify its cause. In other words, reducing latency in detecting a change is likely to improve reinforcement learning in a multi-agent scenario.

Distributed Feedback Monitoring

The distributed feedback monitoring method may be any appropriate distributed feedback monitoring method. Performance measurement systems with dashboards are widely used in many industries to monitor and coordinate performance benchmarks and optimize institutional learning. In some embodiments, simpler dashboard systems may be developed to optimize social learning in a non-commercial setting of online communities. Such dashboards may be particularly useful for online communities that offer services that are used repeatedly by a pool of members. In such cases, it might make sense to present dashboards with trends rather than mean rating scores. experiments can be designed for testing the utility of presenting such trends.

Additionally, the disclosed system can dynamically optimize trend time resolution: e.g., should trend be presented over hours, days, weeks, or months? Presenting short-term trends should minimize delay and improve social learning. However, presenting long term trends may promote stability and improve signal to noise ratio. The disclosed system is designed for testing such dashboard calibrations while keeping the temporal dynamics of service provision fixed. For example, one may assign participants into service provider and service client groups. It generates a virtual world environment that allows them to learn from each other only via a dashboard presenting trends. Simulating the dynamics of social learning via feedback in different conditions them guide communities how to design and tune performance measurement systems.

Figure 3B:
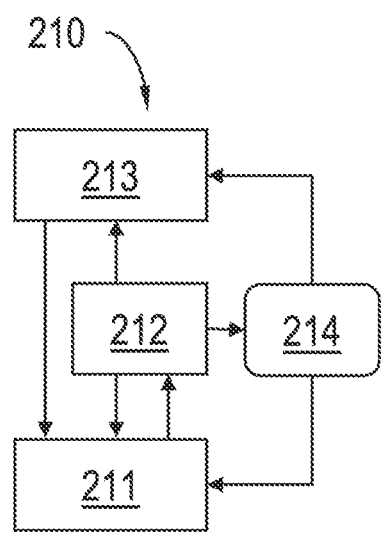

Referring briefly to FIG. 3B, use of a dynamic feedback loop for guiding behaviors can be seen. In this approach 210, the clients 211 provide feedback to a rating device 212 (or the clients use the rating device to submit their feedback to the system running the rating device). The trends in the feedback rating scores are then provided to the clients 211 and the service provider 213 (e.g., the virtual world simulation game provider), who can modify their service, thereby providing feedback to clients 211. The virtual world simulation game experiments can test, for example, if the presentation of trends in rating scores of, e.g., ferry services (in the case of FSG) improves social learning 214, prompting players to adjust their strategies more efficiently.

Note that even in a small community that runs a simple operation, social learning may show complex temporal dynamics: the detection of a trend gives both clients 211 and service providers 213 an opportunity for social learning 214 in real time: service providers can "experimentally" adjust their behavior/product in real time in response to trends, while consumers can make choices with more up-to-date information. The challenge is how to tune the parameters of the trend presentation such that each side can learn most effectively from the other?

Returning to the case of an NGO providing online services (FIG. 1A), should trends in satisfaction with each service type be presented over days, weeks, or months? Presenting short term trends should minimize delay and improve social learning. However, presenting long term trends may promote stability and improve the clarity of social signals. For the NGO, manipulating such parameters can be risky, but such virtual world simulation game experiments can be designed for testing such dashboard calibrations while keeping the temporal dynamics of service provision fixed. For example, using the FSG, in some embodiments, participants may be into terry rider and ferry driver groups, and allow them to learn from each other only via a dashboard presenting trends. Simulating the dynamics of social learning via feedback in different conditions may then guide the NGO on how to design and tune performance measurement systems in their non-market setting monosponistic environment).

Implementation of a Machine Learning Algorithm

The virtual world simulation game experiments can be designed for testing the utility and risks of implementing machine learning for continuous optimization of rating system features. Such features may include, for example, the physics of a rating device, or the temporal resolution of a dashboard presenting trends, or both. About a decade ago, much of the software industry adopted continuous deployment, such that software is continually released and experimented with.

Figure 3C:
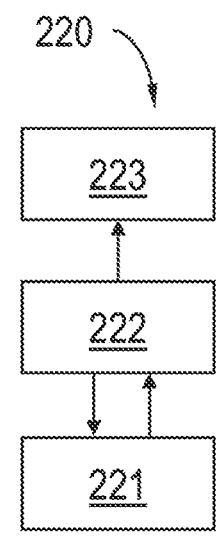

Such commercial systems for automated experimentation with platform design are often based on a closed-loop feedback system. Referring to FIG. 3C, a continuous experimentation model 220 for is shown, where the dashboard design 222 can be modified continuous to provide feedback to the service provide 223 as client behavioral outcomes 221 are influenced.

For example, the "style" of a banner in a web page includes many features, such as screen coordinates, size, colors, and fonts, which can be manipulated while monitoring changes in client behavior. Here, the typical feedback is not rating scores, but changes in traffic, clicking on ads, and so on. Using standard machine learning approaches, such systems can continuously "nudge" the design, with the aim of maximizing outcomes desired by the platform owner.

A similar testing approach might be useful in the implementation of online governance policies.

One may treat a subset of governance logic in a community as a set of features that can be continuously optimized like the case of the ad banner. This could include gain and delay parameters (e.g., how often a certain committee should meet), or setting the threshold of consensus required for votes to enable a petition to pass, etc.

It is envisioned that the virtual world simulation game experiments combining continuous rating feedback (which can be seen as continuous voting) with continuous exploration of governance logic (see FIG. 3C). It is emphasized that trying such an approach in real communities could be dangerous and possibly unethical, and that virtual worlds experiments should be regarded as sandboxes where thresholds for tipping points can be safely established. An example of such an experiment would be implementing a machine learning algorithm to find the temporal resolution of a dashboard that maximizes both service usage and satisfaction with service outcomes over time. There are several risks in running such experiments in an online community. For example, people may (wrongly) perceive that information is being manipulated by bad actors, or the algorithm may become unstable, reducing public confidence. Finally, an experimenter could allow feedback from dashboards to directly guide marginal investments in simulated services via continuous experimentation. The role of such experiments could be to serve as a playground for exploring utility, but even more so, for discovering and then reducing risks prior to deployment in real-world online communities.

A necessary aspect of the disclosed method is the calibration of feedback systems that are attached to specific activities. For example, in a virtual world where participants collect coins (real money) in islands and ride ferries to get to these islands, the ferry services can be either public goods, common pool resources, or just private companies. Either way, participants should care about those services, and may share information about their satisfaction via a dashboard. At this point there is already a need for governance: should information be available to everyone (public good) or only to members (common pool resource)? How to advertise it? How to display the information in an optimal manner? For example, a dashboard could show trends of satisfaction with ferry services before riding a ferry. The experiential challenge is to allow such a dashboard to directly nudge policies and governance logic.

For this purpose, it is suggested that a generic framework for long term experiments may be to simulate a virtual city, where participants are engaged in a variety of activities, providing other services, instituting taxes and tolls, and forming simple governance institutions.

Figure 4A:
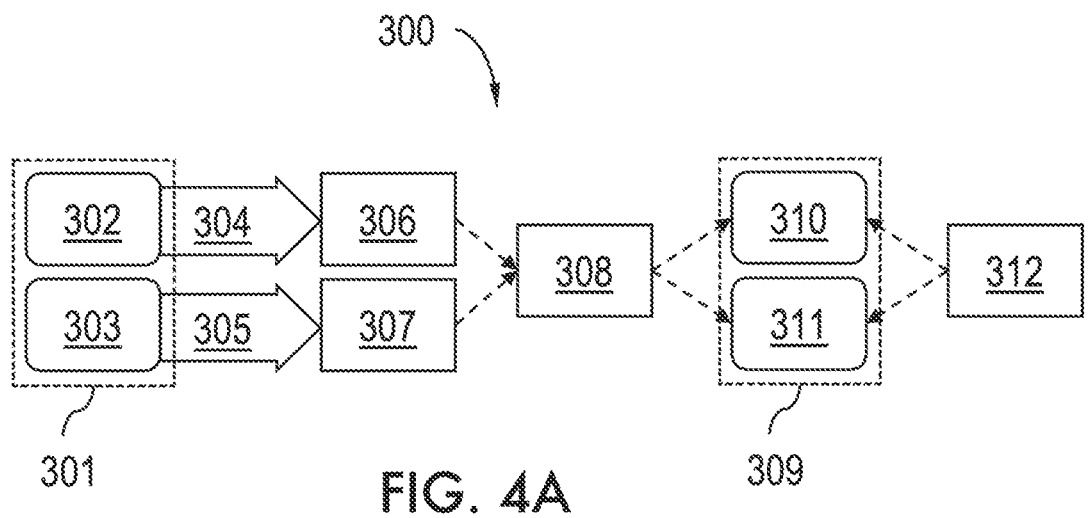
FIGS. 4A-4B are schematic illustrations of examples of a game design simulating governance of pooled resources (services) via feedback in a community.

Referring to FIG. 4A, a virtual world simulation game design 300 simulating governance of pooled resources (services) via feedback in a community with no market (as in FIG. 1A). In this embodiment, groups of participants work as a service provider 309 in providing one or more simulated services (preferably a plurality of service) 310, 311 (e.g., driving ferries, minting coins, etc.) and another group represents community members who work as clients 301 who use these services (302, 303) (e.g., riding ferries, collecting coins, etc.). Feedback 304, 305 from participants' satisfaction and service usage is aggregated into one or more dashboards 306, 307 presenting trends. These trends then feed into governance logic, used by the evaluation committee 308. The board 312 sets, e.g., fees and budgets for each service 310, 311.

Here, the experimenter needs to design an ecosystem 300 with several groups of players. For example, in FIG. 4A, one group of players represents community members 301 who use common pool resources 302, 303 (e.g., coins and ferries). They may pay tolls for those services and rate them (e.g., provide feedback 304, 305). The measure of performance may be, e.g., net coin earning, and the level of cooperation is the feedback rate. Other groups of players are service providers 309 (e.g., ferry drivers and coin minters). Each of these groups plays a public goods game: in each round these players decide how much of their income (from services and tolls) to invest in these services. The more they invest, the faster the ferries move and the more coins can be collected in each island. If properly designed, such a system may stabilize on different levels of cooperation: the community may decide to pay more or fewer tolls based on their satisfaction with the services. The service providers may decide to invest more or less of their toll income in the quality of these services.

Note that the game design presented in FIG. 4A is a simulation of the community presented in FIG. 1A, including two rating systems, two dashboards displaying trends, a committee and a board. Other configurations are readily envisioned. For example, in some embodiments, the simulation may include only one rating system. In some embodiments, the simulation may include two rating systems. In some embodiments, the simulation may include a plurality of rating systems. In some embodiments, the simulation may include only one dashboard. In some embodiments, the simulation may include two dashboards. In some embodiments, the simulation may include a plurality of dashboards.

Once participants are recruited to play on a regular basis, communication channels can be used for implementing governance structure including committees, boards and voting. The experimenter could also impose community rules or, alternatively, allow participants to negotiate them. One may see some communities where cooperation collapses and others where cooperation persists, in much the manner that online communities can already be observed to develop rich and varied governance systems for overcoming their online governance challenges. In sum, there is a potential value in developing such virtual worlds experiments to facilitate the Lamarckian evolution of governance.

One inherent weakness of this approach is a potential experimental failure due to the complexity of the design. How can these experiments succeed in exploring a complex governance space? This challenge is somewhat similar to that of experimenting in exploring human perceptual space in the field of cognitive neuroscience. One may ask, for example, what set of acoustic features add up to an abstract percept such as the sound of a violin. Until recently, exploring the space of such high-dimensional acoustic features was not experimentally feasible. Recently, however, combining machine learning with human judgement was shown to be successful in efficiently identifying such perceptual categories. In such experiments, participants are presented with a slider, which they manipulate to approximate a category (e.g., determine which sound resembles a violin). Although the participant repeatedly manipulates the same slider, in each round the slider represents a different acoustic feature. The algorithm pools these evaluations across participants to explore the perception of an arbitrarily complex space of acoustic features in an efficient manner. At least conceptually, a similar approach could be implemented in the virtual world simulation game experiments.

To avoid failure due to the complexity of the design, in some embodiments, participants may be presented with sliders representing their preferences in governance space. For example, a slider can be presented to cast a preference for the ferry toll, or to vote for a governance rule about feedback quota, etc. These votes can be polled and aggregated. Even if this governance space includes several parameters, this approach may allow the efficient exploration of the governance space by implementing modern machine learning methods. The utility of such an approach is in detecting and characterizing stable states in the space of governance features.

Separately, online governance consists of a democratic debate, where participants are verbalizing and communicating views, grievances and needs. Experimenting with feedback systems and exploring governance space using a virtual world simulation game, where governance is based primarily on simple quantitative measures, may fail to capture or acknowledge the minority view and its legitimacy or even nuances in the views of the majority. Therefore, in some embodiments, it may be desirable to simulate a petition governance (see FIG. 4B) to allow experimenting with the tradeoff between openness and control.

Figure 4B:
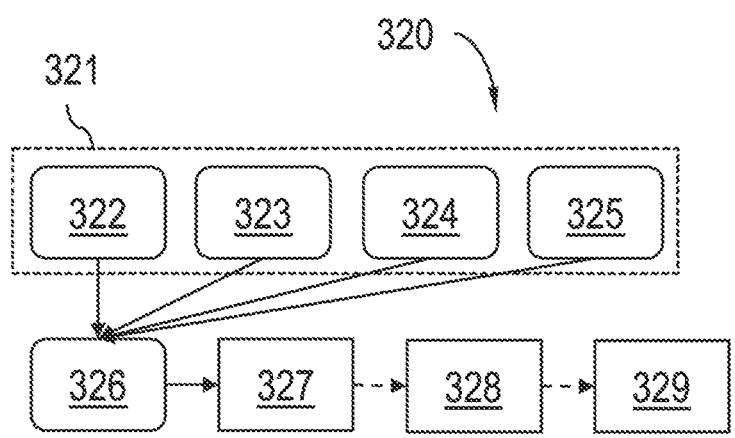

As is seen in FIG. 4B, a virtual world simulation game design 320 simulating a marketplace optimization via petition governance (as in FIG. 1B) is shown. The community 321, which includes users 322, 323 and providers 324, 325 of services, sets an annual petitions quota on each member. They set two committees 327, 328 and a board 329 to process the stream of petitions entering the petition system 326. As described with regards to FIG. 1B, petitions are first sorted into clusters by one committee 327. A second committee 328 then evaluates costs and feasibilities for each cluster. Finally, the board 329 sets policies based on the sorted and evaluated petitions.

Figure 5:
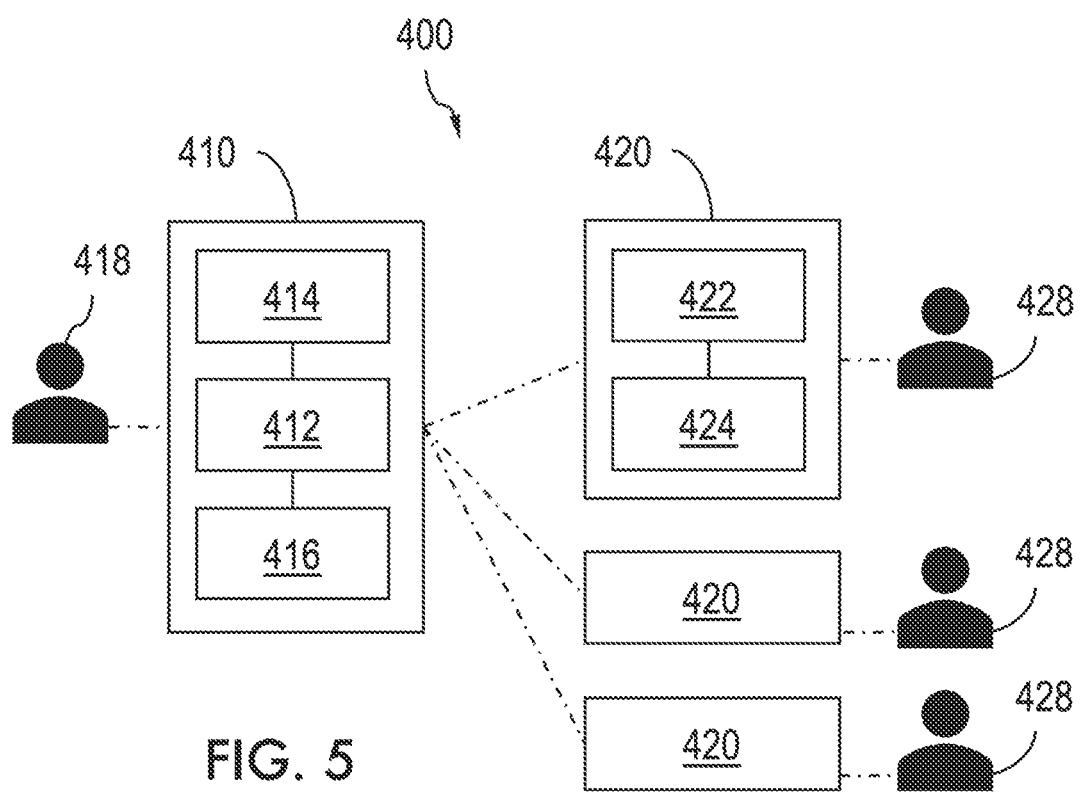
FIG. 5 is a schematic illustration of an embodiment of a system.

Referring to FIG. 5, a system that utilizes the disclosed method can be seen. In some embodiments, the system 400 may include a server 410 and a plurality of clients 420.

The server may include a processor 412 and a non-transitory computer readable medium 414. The non-transitory computer readable medium contains instructions that, when executed, cause the processor to perform several tasks. The processor is configured to allow a plurality of users 428 on a plurality of clients 420 to access a virtual world simulation game capable of gathering input from each user, the game based on one or more parameters, the parameters relating to a rating device, a distributed feedback monitoring method, implementation of a machine learning algorithm for optimization of rating system features, or a combination thereof. The processor is configured to allow an administrator 418 to set or adjust at least one of the one or more parameters. The processor is configured to send data to display to one of the plurality of users prior to the user sending feedback, the data comprising at least one previous rating, an average rating, a rating trend, information from related feedback, or a combination thereof. The processor is configured to receive feedback from the plurality of users 428 during the virtual world simulation game and from at least one additional virtual world simulation game where at least one of the one or more parameters has been changed. And the processor is configured to display the feedback, one or more values derived from the feedback, one or more values derived from a ground truth and the feedback, or a combination thereof (e.g., to an admin 218).

The server 410 may also comprise a separate database 416 where feedback can be stored and retrieved.

Each client 420 may comprise a client processor 422 and a non-transitory computer readable medium 424. The non-transitory computer readable medium contains instructions that, when executed, cause the client processor to perform several tasks. One task is to allow a user 428 to enter feedback while the user is playing a virtual world simulation game. Multiple parameters may be set or adjusted dynamically during the virtual world simulation game. This can be done by, e.g., sending a request for feedback, displaying a field for the user to enter feedback or displaying a graphical user selection component (such as a slider, radio buttons, etc.), and allowing the user to interact with that field or graphical user selection component.

Another task is to receive data from the server 410 related to the feedback before or during a time when the feedback is entered. Another task is to display the received data. For example, this could be displaying a trend of ratings before or while the user is adjusting a slider bar to set the number of stars they would want to provide as feedback.

After the feedback has been entered by the user and received by the client processor, another task is to send the feedback to the server.

Embodiments of the present disclosure are described in detail with reference to the figures wherein like reference numerals identify similar or identical elements. It is to be understood that the disclosed embodiments are merely examples of the disclosure, which may be embodied in various forms. Well known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Those skilled in the art will recognize or be able to ascertain using no more than routine experimentation many equivalents to the specific embodiments of the invention described herein. Such equivalents are intended to be encompassed by the following claims.

What is claimed is:
1. A method for optimizing feedback, comprising:
 a. providing a virtual world simulation game capable of gathering input from a user, the virtual world simulation game based on one or more parameters, the one or more parameters relating to a rating device, a distrib- uted feedback monitoring method, implementation of a machine learning algorithm for optimization of rating system features, or a combination thereof;
b. allowing a plurality of users to participate in the virtual world simulation game;
c. setting or adjusting multiple parameters dynamically during the virtual world simulation game;
d. capturing a set of feedback from the plurality of users during the virtual world simulation game, where a dashboard showing at least one previous rating, an average rating, a rating trend, information from related feedback, or a combination thereof is displayed to at least one of the plurality of users before the set of feedback is captured;
e. repeating step c-d at least once;
f. displaying the captured sets of feedback, one or more values derived from the captured sets of feedback, one or more values derived from a ground truth and the captured sets of feedback, or a combination thereof;
g. receiving a selection of one of the captured sets of feedback; and
h. implementing a feedback system outside the virtual world simulation game based on the parameters used when the selected set of feedback was captured,
wherein the information from related feedback is based on a determined similarity between text in the information and text received from the user and/or the virtual world simulation game is configured to allow an early detection of a change in cooperation and crowd-wisdom.

2. The method according to claim 1, wherein each plurality of users is subdivided into a plurality of subgroups, and each subgroup represents a different group within the game.

3. The method according to claim 2, wherein a first subgroup represents consumers, and a second subgroup represents service providers.

4. The method according to claim 2, wherein one or more of the plurality of users serves on a committee, a board, or both, within the game.

5. The method according to claim 1, further comprising occasionally receiving feedback from each user relating to that user's preferences in governance space.

6. The method according to claim 1, wherein the adjustment to a parameter is a step change or a trajectory parameter transition over time.

7. The method according to claim 1, wherein the early detection of the change anticipates an imminent collapse of the system.

8. The method according to claim 7, further comprising preventing a collapse of the system based on the early detection of the change.

9. A server, comprising:
a processor; and
a non-transitory computer readable medium containing instructions that, when executed, cause the processor to:
allow a plurality of users on a plurality of clients to access a virtual world simulation game capable of gathering input from each user of the plurality of users, the game based on one or more parameters, the parameters relating to a rating device, a distributed feedback monitoring method, implementation of a machine learning algorithm for optimization of rating system features, or a combination thereof;
allow an administrator to set or adjust at least one of the one or more parameters;
send data to display to the plurality of users prior to each user sending feedback, the data comprising at least one previous rating, an average rating, a rating trend, information from related feedback, or a combination thereof;
receive feedback from the plurality of users during the virtual world simulation game and from at least one additional virtual world simulation game where at least one of the one or more parameters has been changed; and
display the feedback, one or more values derived from the feedback, one or more values derived from a ground truth and the feedback, or a combination thereof,
wherein the information from related feedback is based on a determined similarity between text in the information and text received from the user and/or the virtual world simulation game is configured to allow an early detection of a change in cooperation and crowd-wisdom.

10. A system comprising:
a server according to claim 9 configured to provide a virtual world simulation game; and
a plurality of clients, each client comprising:
a client processor; and
a non-transitory computer readable medium containing instructions that, when executed, cause the client processor to:
allow a user to enter feedback while the user is playing the virtual world simulation game;
receive data from the server related to the feedback before or during a time when the feedback is entered;
display the received data; and
send the feedback to the server.

11. A client for optimizing feedback, comprising:
a client processor; and
a non-transitory computer readable medium containing instructions that, when executed, cause the client processor to:
allow a user to enter feedback while playing a virtual world simulation game, where multiple parameters are set or adjusted dynamically during the virtual world simulation game;
receive data from a server related to the feedback before or during a time when the feedback is entered;
display the received data; and
send the feedback to the server,
wherein the virtual world simulation game is configured to allow an early detection of a change in cooperation and crowd-wisdom.

* * * * *